April 13, 1954  W. B. McCALL  2,674,982
INTERNAL-COMBUSTION ENGINE
Filed Sept. 14, 1951  5 Sheets-Sheet 4

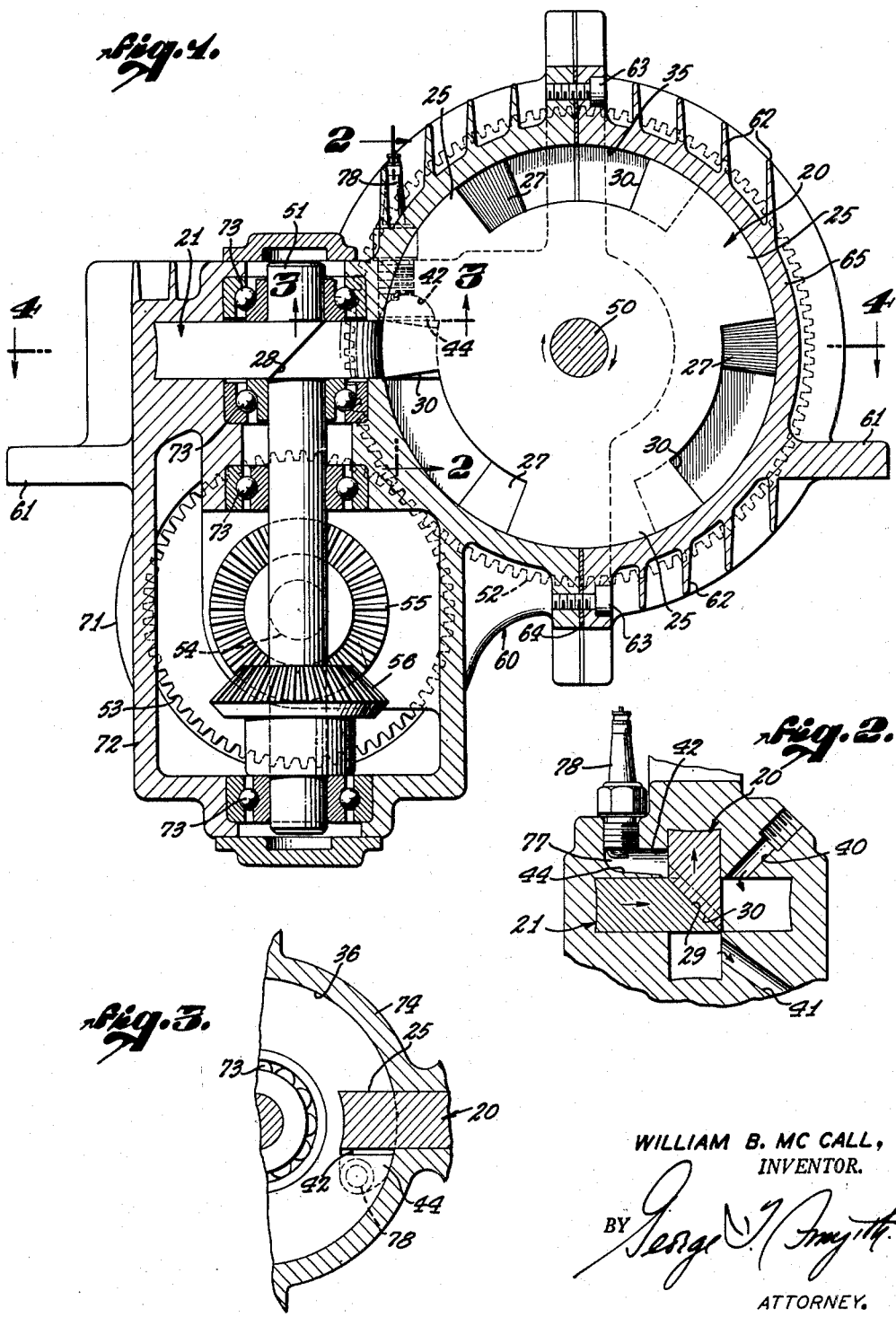

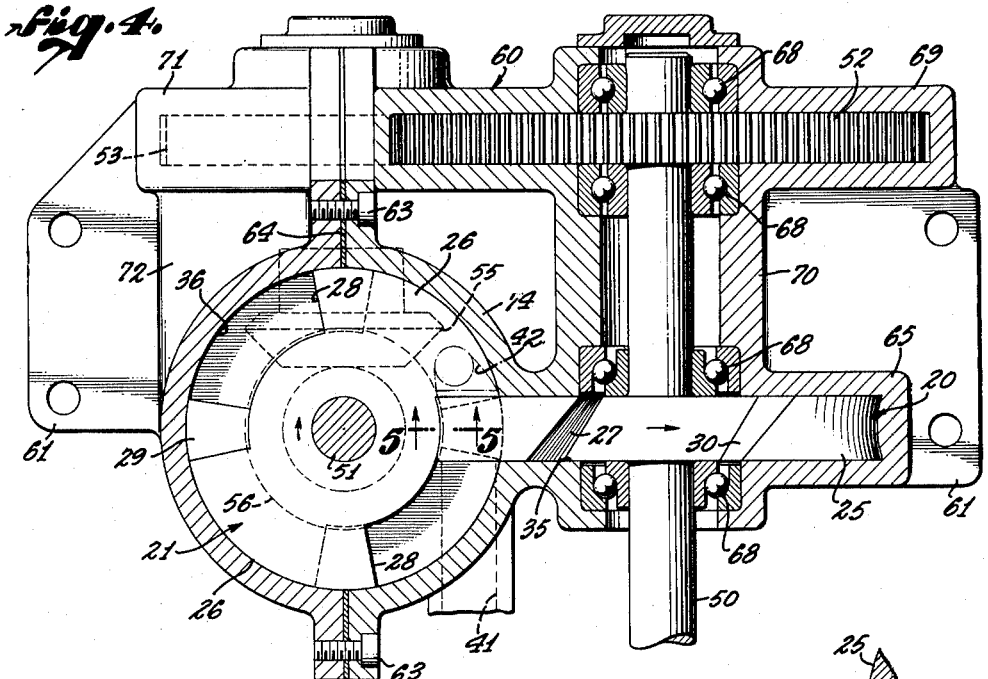

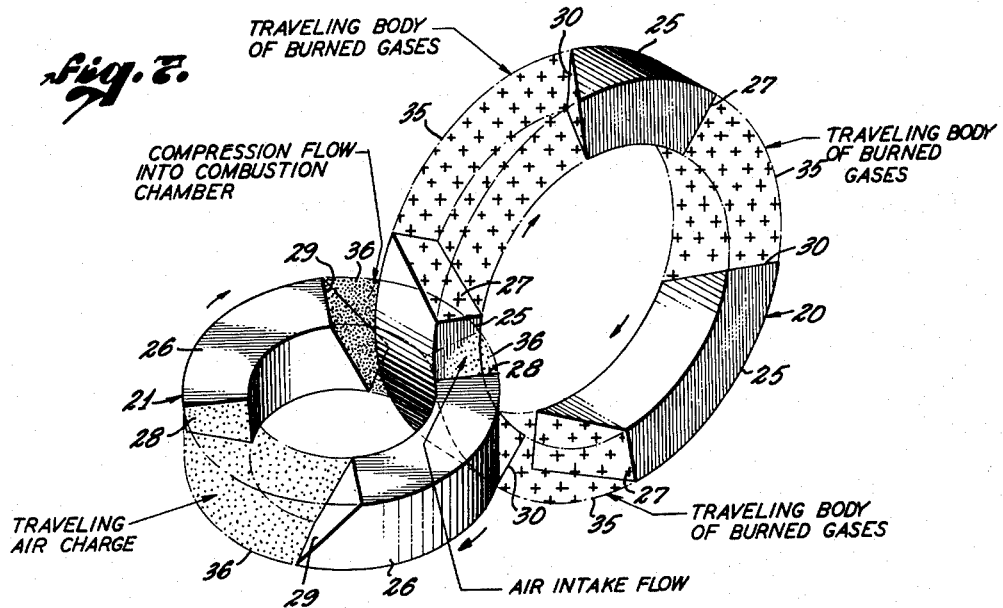
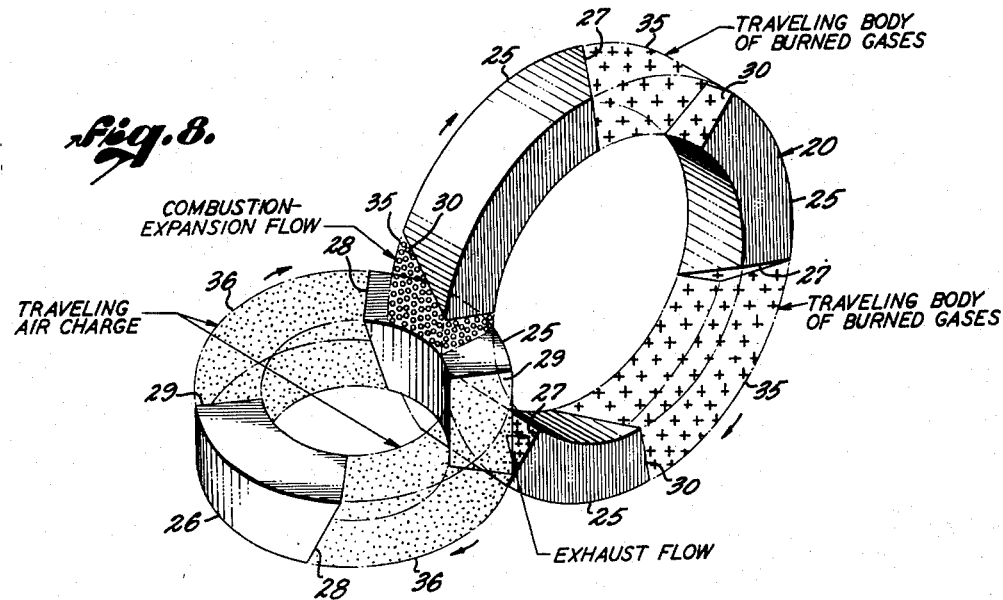

WILLIAM B. MC CALL,
INVENTOR.

BY George J. Smyth
ATTORNEY.

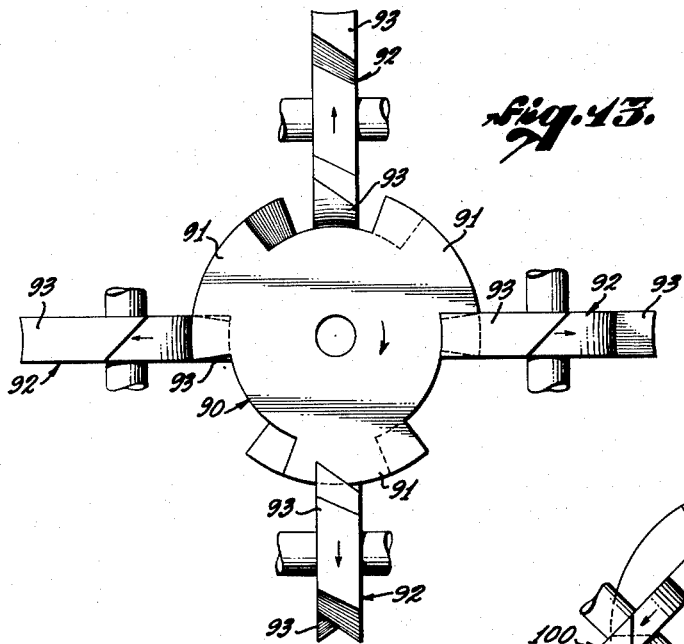
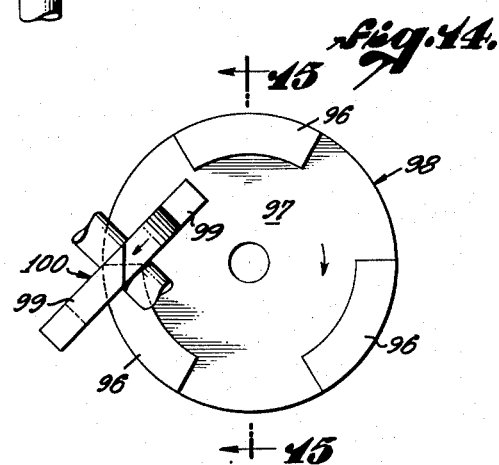
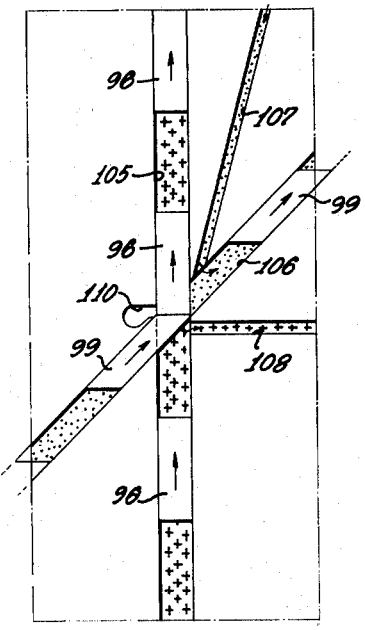
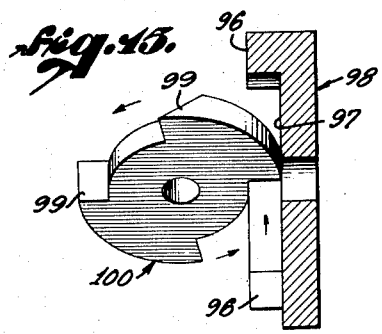
WILLIAM B. MC CALL,
INVENTOR.
ATTORNEY.

Patented Apr. 13, 1954

2,674,982

UNITED STATES PATENT OFFICE 2,674,982

INTERNAL-COMBUSTION ENGINE

William B. McCall, Arcadia, Calif.

Application September 14, 1951, Serial No. 246,536

14 Claims. (Cl. 123—13)

This invention relates to internal combustion engines and more particularly to an engine of the rotary type in which abutments adapted to serve as pistons as well as cylinder heads are fixedly mounted on a rotor for operation in a circular passage that is formed by the rotor together with a surrounding stationary casing or stator. The general object of the invention is to provide such a rotary engine of simple construction and relatively few moving parts that operates in a balanced, efficient manner free of vibration and without the usual consumption of energy by continually repeated acceleration and deceleration of reciprocating parts.

A typical engine of this type, which may be briefly discussed by way of example, has a main rotor with peripheral pistons and coacting auxiliary rotors, usually two, which periodically block the path of the peripheral pistons thereby forming with the peripheral pistons contracting and expanding spaces for fluid intake compression, combustion, and exhaust. The auxiliary rotors act, in effect, as sliding gates that periodically move completely out of the path of the pistons to permit the pistons to pass.

Each auxiliary rotor member, as it withdraws from the path of an approaching piston, momentarily opens up free communication between a contracting space and an expanding space. The contracting space is between the auxiliary rotor and the approaching piston while the adjacent expanding space is on the other side of the auxiliary rotor between the auxiliary rotor and a receding piston.

Again, after the approaching piston reaches and passes the retracted auxiliary rotor, the rotor cannot close the passage behind the piston fast enough to prevent communication between an expanding space and a contracting space. In this second instance the expanding space is between the auxiliary rotor and the piston that has just passed, while the contracting space is between the auxiliary rotor and the approaching next succeeding piston.

Thus, while one space is contracting on one side of an auxiliary rotor, another space is expanding on the other side of the auxiliary rotor and communication between the two spaces is open momentarily both at the beginning of the contraction of the one space and at the end of the contraction of the one space. It is apparent that if a fuel charge is in the one contracting space, the fuel charge will be ignited by communication with the burning charge in the adjacent expanding space.

To avoid this difficulty a typical rotary engine of this type provides a temporary storage compartment into which a charge of fuel compressed by the contraction of a space is temporarily stored before the space is completely contracted and this fuel charge is subsequently released to a second expanding space after initial expansion of the second space. This arrangement avoids direct communication between an unfired fuel charge in a contracting space and a burning fuel charge in an adjacent expanding space. It is to be noted, however, that this solution of the difficulty fails to take advantage of the full expansion and contraction of the two adjacent spaces. In other words, something less than the actual displacement volumes of the spaces is utilized since the fuel charge or fresh air in a contracting space is displaced therefrom before complete contraction of the space and, on the other hand, the stored compressed fuel charge or fresh air is not released into a subsequently expanding space until after a certain amount of the expansion has occurred.

An important object of my invention is to utilize the full expansion and contraction of these spaces in the engine cycle and at the same time to eliminate the necessity for a temporary storage chamber. In general this object is attained by a combination of two concepts. The first concept is to construct the auxiliary rotors with pistons in the same manner as the main rotor and to transfer the functions of intake and compression from the pistons of the main rotor to the pistons of the auxiliary rotors. Thus the pistons on the auxiliary rotors will travel through circular paths that will intersect the paths of the pistons on the main rotor, the auxiliary pistons and the main pistons alternately passing through the intersection of the two piston paths.

The second concept is to make the main pistons and auxiliary pistons long enough to follow each other in such close succession that the intersection of the two piston paths will be continuously occupied either by an auxiliary piston or by a main piston or parts of both pistons. In carrying out this latter concept it is further contemplated that the two sets of pistons will have what may be conveniently termed beveled leading and trailing ends, the bevel of the leading end of an auxiliary piston conforming to the bevel of the trailing end of a main piston, and the bevel of the trailing end of an auxiliary piston, conforming to the bevel of a leading end of a main piston. The matching surfaces conform to generated curves. This matched beveling of the two sets of pistons greatly reduces, if not practically eliminates, the previously described communication between succeeding spaces that are expanded and contracted by the main pistons.

As will be apparent from the detailed description of the invention to follow, each auxiliary piston has two functions and likewise each main piston has two functions. One function of the auxiliary pistons is to expand and contract spaces for intake and compression of fuel charges or charges of fresh air and the other function is to serve as abutments across the paths of the main pistons for cooperation with the main pistons in forming expansion spaces for power combustion and contracting spaces for the exhaust of burned gases. Conversely one function of the main pistons is to expand and contract spaces for power combustion and exhaust and the other function is to serve as abutments in the paths of the auxiliary pistons, thereby to cooperate with the auxiliary pistons to form the expanding and contracting spaces for intake and compression prior to combustion.

A further object of the invention is to achieve an arrangement in which a plurality of engine cycles will be carried out in the course of one rotation of the main rotor. In one form of the invention, for example, where two auxiliary pistons are combined with three main pistons, three complete cycles of intake, compression, combustion, and exhaust are completed on each rotation of the main rotor. In a further example, where four auxiliary rotors are combined with a main rotor, twelve such cycles are completed on each rotation of the main rotor.

The further object of the invention is to achieve an arrangement which may be adapted to function also as a turbine, either gas or steam, or as a compressor or pump.

The above and other features and advantages of the invention may be understood from the following detailed description of the invention taken with the accompanying drawings.

In the drawings, which are to be regarded as merely illustrative

Figure 1 is a sectional view of a preferred embodiment of the invention;

Figure 2 is a fragmentary section taken as indicated by the line 2—2 of Figure 1;

Figure 3 is a fragmentary section taken as indicated by the line 3—3 of Figure 1;

Figure 4 is a central section taken as indicated by the line 4—4 of Figure 1;

Figure 5 is a fragmentary section taken as indicated by the line 5—5 of Figure 4;

Figure 6 is a perspective view of the main rotor and auxiliary rotor in their coacting positions;

Figures 7 and 8 are diagrammatic views illustrating the operating cycle of the engine;

Figure 9:
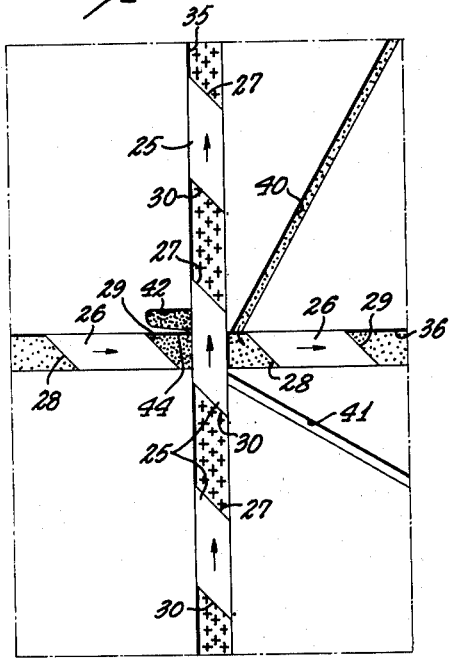
Figure 10:
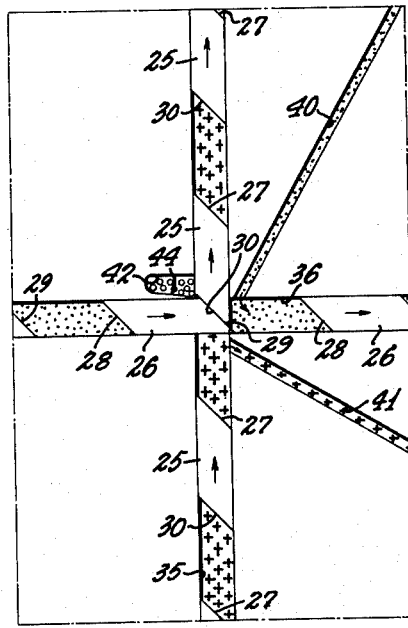
Figure 11:
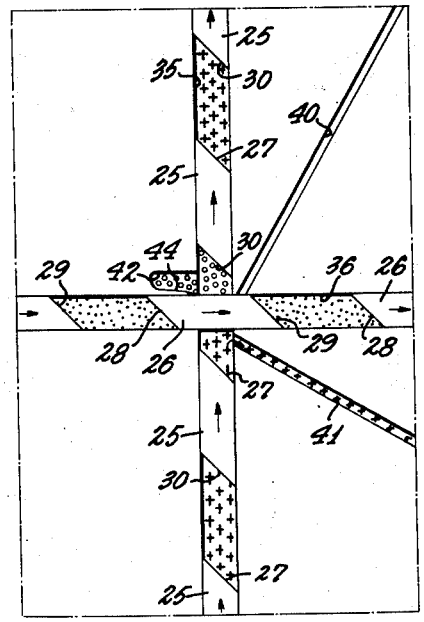
Figure 12:
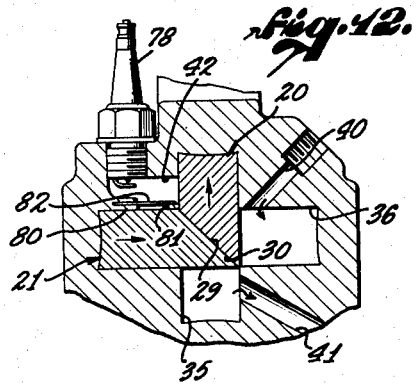

Figures 9, 10, and 11 are diagrammatic views showing the relation of the two rotors to an intake passage, an exhaust passage and a passage to a combustion chamber;

Figure 12 is a view similar to Figure 2 showing how a check valve may be incorporated in the engine;

Figure 13 is a simplified diagram showing how a plurality of auxiliary rotors may be combined with one main rotor;

Figures 14 and 15 are simplified diagrammatic views showing how two rotors may be used with a different angular relationship; and Figure 16 is a diagram showing how the intake passage, exhaust passage, and combustion chamber may be related to the two rotors of Figures 14 and 15.

Construction of the rotors

The construction, as well as the relative movements of the two rotors of the preferred form of the invention, may be understood by first referring to Figure 6 which shows a first or main rotor 20 positioned for cooperation with a second or auxiliary rotor 21. The main rotor 20 may be a flat block of metal of the general configuration of a relatively thick disc having three equally spaced peripheral abutments 25 constituting a first set of pistons which may be termed the main working pistons of the engine. In like manner the auxiliary rotor 21 of the same general configuration has two equally spaced abutments 26 constituting a second set of pistons which may be conveniently termed the auxiliary working pistons of the engine.

It will be noted that the planes of rotation of the two rotors 20 and 21 are intersecting planes, in this particular instance intersecting at approximately 90 degrees from each other, and it will be further noted that the circular path of the main pistons 25 intersects the circular path of rotation of the auxiliary pistons 26, the tangents of the two circular paths at the intersection being in this instance approximately 90 degrees from each other. It will be readily understood that when the two rotors 20 and 21 are enclosed by a suitable close-fitting casing as will be described later, each of the rotors will form with the surrounding casing a corresponding circular working passage for the pistons on the rotor and that these passages will intersect to form what may be termed an intersection space through which the main pistons 25 and the auxiliary pistons 26 pass alternately.

It is contemplated that the two rotors 20 and 21 will be operatively interconnected or interlocked by suitable gearing for synchronization and that the main pistons 25 and the auxiliary pistons 26 will be so dimensioned and so shaped that the leading end of one piston entering the intersection space will, in effect, overlap the trailing end of the preceding piston leaving the intersection space in such manner that the intersection space will be substantially completely filled by the metal of one or both of the two sets of pistons at all times.

To carry out this concept the leading and trailing ends of the main pistons 25 and the auxiliary pistons 26 are beveled, to use the term somewhat loosely, so that the leading face of a piston on each rotor is complementary to the trailing face of a piston on the other rotor. The actual configuration of the piston faces conform to generated curves to the end that the leading face 27 of a main piston 25 approximates at least line contact with the trailing face 28 of a preceding auxiliary piston 26 in the intersection space and, on the other hand, the leading face 29 of an auxiliary piston 26 at least approximates line contact with the trailing face 30 of a preceding main piston 25. It is further contemplated that the peripheral surfaces of the pistons of each rotor will be transversely concave and the peripheral surfaces between the pistons of each rotor will likewise be transversely concave, the peripheral concavity of the pistons on one rotor closely matching the concavity of the periphery of the other rotor between the pistons on the other rotor.

By virtue of the matching leading and trailing faces of the pistons and the close fitting permitted by the concavity of coacting peripheral surfaces, each piston of the two rotors periodically seals or blocks the circular working passage through which the pistons of the other rotor travel and the continuity with which the pistons of the two rotors alternately perform this blocking or sealing function substantially continuously seals the two circular working passages off from each other.

*Diagrammatic explanation of the engine cycle*

The general mode of operation of the engine may be understood by referring to Figures 7 and 8 which show the main pistons 25 and the auxiliary pistons 26 apart from their respective rotors. A circular working passage 35 in which the main pistons 25 travel is indicated by broken lines and in the same manner a circular working passage 36 in which the auxiliary pistons 26 travel is indicated by broken lines, these two passages having in common the previously mentioned intersection space through which the main pistons and auxiliary pistons pass alternately.

Figures 7 and 8 illustrate, respectively, two situations which occur alternately in the normal operation of the engine. In the first situation represented by Figure 7, one of the main pistons 25 completely occupies the intersection space thereby completely sealing the circular working passage 36 in which the auxiliary pistons 26 travel. Thus, the main piston 25 in the intersection space in Figure 7 acts as a valve or rotary abutment cooperating with one auxiliary piston 26 to form an expanding space in the working passage 36 as the auxiliary piston moves away from the blocking main piston 25, and also cooperating with a second auxiliary piston 26 to form a contracting space in the working passage 36 as the second auxiliary piston moves towards the blocking main piston. If a suitably positioned intake passage is provided, fresh air or air laden with fuel flows into the auxiliary circular working passage 36 behind the first auxiliary piston 26 on one side of the blocking main piston 25, as indicated by the labeled intake arrow in Figure 7. Such air is represented by scattered dots in the drawing. At the same time the second auxiliary piston 26 in moving towards the blocking main piston 25 cooperates therewith to compress a charge of air into a combustion chamber as indicated by the second labeled arrow in Figure 7. It can be seen that in the meantime a traveling air charge trapped between the two auxiliary pistons 26 is moving into a position to be compressed when the next succeeding main piston 25 occupies the intersection space.

It is apparent that in this first situation shown in Figure 7 only the two auxiliary pistons 26 are functioning strictly as pistons and that compression and expansion occur only in the auxiliary circular working passage 36. At this time the three main pistons 25 in the main circular working passage 35 merely trap three successively formed traveling bodies of burned gases indicated by small scattered crosses.

In the succeeding alternate situation represented by Figure 8, one of the auxiliary pistons 26 instead of a main piston 25 occupies the intersection space and thereby seals or blocks the main circular working passage 35. Neither expansion nor contraction occur at this time in the auxiliary circular working space 36, this circular space being occupied by two traveling air charges. As one of the main pistons 25 moves away from the blocking auxiliary piston 26 a burning fuel charge from the combustion chamber, represented by small scattered circles, is admitted to the expanding space behind the main piston for the working expansion of the gas to provide the power stroke of the engine. This movement of the burning gas into the main circular working passage 35 is indicated by the labeled arrow in Figure 8. At the same time a second main piston 25 approaching the blocking auxiliary piston 26 contracts a space in the main circular working passage 35 to expel one of the traveling bodies of burned gases outward through a suitably provided exhaust passage as indicated by the second labeled arrow in Figure 8.

The principle of operation of the engine may be understood from the above description of Figures 7 and 8, it being apparent that these two alternate situations follow each other without time gaps and without any appreciable direct communication between the two intersecting circular working passages 35 and 36.

A more specific understanding of how the two sets of pistons cooperate with each other and also cooperate with the various passages for gas flow may be approached by considering Figures 9, 10, and 11. These figures are diagrams illustrating the relative positions of the two circular working passages 35 and 36, an intake passage 40, an exhaust passage 41 and a passage 42 for communication with the combustion chamber of the engine.

Figure 9 will be recognized as corresponding to the previously described Figure 7 representing the situation in which one of the main pistons 25 completely occupies the intersection space of the two circular working passages 35 and 36. It will be noted that the intake passage 40 is in communication with the circular working passage 36 behind one of the moving auxiliary pistons 26 and that the passage 42 communicating with the combustion chamber is receiving a charge of fresh air that is being compressed and displaced by the movement of the second auxiliary piston 26 towards the blocking main piston 25.

In the preferred arrangement shown, the passage 42, communicating with the combustion chamber, has a relatively large area opening onto the main circular working passage 35, but a thin web or lip of metal 44 is provided to restrict communication between the passage 42 and the auxiliary circular working passage 36. The lip restricts the communication to a small narrow zone immediately adjacent the intersection space of the two circular working passages. The purpose of the lip 44 is to discourage back flow from the passage 42 into the circular working passage 36 thereby to minimize the likelihood of ignition of a fresh charge in the circular working passage 36 by burning fuel from the passage 42 and to increase the length of the power stroke.

Figure 11 will be recognized as corresponding to the previously described Figure 8 which represents the situation when one of the auxiliary pistons 26 completely occupies the intersection space to cut off the main circular working passage 35. It will be noted the passage 42 communicating with the combustion chamber opens into the main circular working passage 35 behind one of the main pistons 25 for expansion of the burning gases to exert working force on the trailing face 30 of the main piston. It will be further noted that at the same time a second main piston 25 is approaching the blocking auxiliary piston 26 thereby contracting a space in the main circular working passage 35 for the displacement of burned gases into the exhaust passage 41.

Figure 10 represents a moment of transition from the situation represented by Figure 9 to the situation represented by Figure 11. It will be noted that one of the auxiliary pistons 26 overlaps one of the main pistons 25 in the sense that cooperating end portions of the two pistons occupy the intersection space at the same time, the leading face of one piston making substantially sealing contact with the trailing face of the preceding piston.

*Preferred specific embodiment of the invention*

By way of example, Figures 1 to 5 show how the previously described main rotor 20 and auxiliary rotor 21 may be incorporated in a presently preferred embodiment of the invention.

The principal working parts shown in Figures 1 and 2 include the main rotor 20 mounted on a main shaft 50, the auxiliary rotor 21 mounted on an auxiliary shaft 51, a spur gear 52 on the main shaft 50 meshed with a smaller spur gear 53 on a connecting shaft 54, and, finally, a beveled gear 55 on the connecting shaft 54 enmeshed with a second beveled gear 56 on the auxiliary shaft 51. It will be noted that the gearing in this arrangement operatively interconnects and interlocks the two rotors 20 and 21 for synchronous operation to cause the main pistons 25 to coact with the auxiliary pistons 26 in the previously described manner.

The concavity of the periphery of the pistons of the main rotor to fit the periphery of the auxiliary rotor is apparent in Figures 4 and 6. In the same way, the concavity of the periphery of the pistons of the auxiliary rotor to conform to the periphery of the main rotor is shown in Figures 1 and 5.

The casing, generally designated by numeral 60, to house these working parts has suitable base flanges 61 by means of which it may be mounted on a suitable support and preferably is provided with suitable exterior fins 62 to facilitate air cooling. For convenience in fabrication and assembly the casing 60 may be made in a number of sections which are interconnected by suitable cap screws 63 with suitable intervening sealing gaskets 64.

The casing 60 includes a housing portion 65 that encloses the main rotor 25 and together with the main rotor provides the main circular working passage 35 through which the main pistons travel. Two suitable anti-friction bearings 68 for the main shaft 50 are mounted in the housing portion 65 and a second pair of bearings 68 for the main shaft is mounted in a housing portion 69 that surrounds the larger spur gear 52. These two housing portions 65 and 69 of the casing are interconnected by a circular wall 70 that encloses the main shaft 50.

A housing portion 71 of the casing 60 encloses the smaller spur gear 53 and also encloses suitable bearings (not shown) for the connecting shaft 54. The connecting shaft 54 extends into another housing portion 72 of the casing 60 that encloses the two beveled gears 55 and 56 and also seats a pair of anti-friction bearings 73 for one end of the auxiliary shaft 51. Finally a housing portion 74 of the casing 60 encloses the auxiliary rotor 21 and seats two additional bearings 73 for the auxiliary shaft 51. This last housing portion 74 together with the auxiliary rotor 21 forms the second circular working passage 36 through which the auxiliary pistons 26 travel.

The previously mentioned intake passage 40 that communicates with the auxiliary circular working passage 36 is shown in longitudinal section in Figure 2. The previously mentioned exhaust passage 41 that communicates with the main circular working passage 35 is shown in dotted lines in Figure 4. As indicated in solid lines in Figure 2 and by dotted lines in Figure 1, the previously mentioned passage 42 is a relatively short passage communicating with a combustion chamber 77. The combustion chamber 77 may be provided with the usual spark plug 78 for igniting the successive compressed fuel charges. Figure 2 shows the previously mentioned metal lip 44 that restricts communication between the passage 42 and the auxiliary circular passage 36.

The manner in which this specific embodiment of the invention operates may be readily understood from the previous diagrammatic explanation based on Figures 7 to 11.

*Modified forms of the invention*

Figure 12 shows how the previously described lip of metal 44 associated with the combustion passage 42 may be replaced by a thin wall 80 having a port 81 controlled by a suitable check valve. In the particular construction shown the check valve is in the form of a flap valve, the valve member being a suitable flexible member 82 that opens in response to fluid pressure from the auxiliary circular working passage 36 and closes automatically in the absence of such pressure. Such a check valve is useful when the air inhaled by the engine through the intake passage 40 carries a fuel charge, but is not necessary when the fuel is injected directly into the combustion chamber 77. In the latter situation the intake charge is not combustible and therefore it is not necessary to protect the intake charge from the burning gases in the passage 42.

The purpose of Figure 13 is to illustrate the fact that a plurality of rotors may be combined advantageously with a single rotor. In this particular arrangement a single main rotor 90 having three main peripheral pistons 91 is combined with four equally spaced auxiliary rotors 92. Each of the four auxiliary rotors 92 has two equally spaced auxiliary pistons 93 and the five rotors are operatively interconnected and interlocked for synchronous operation. It will be readily understood from the previous explanation of the mode of operation of the invention that with suitable intake passages corresponding to the four auxiliary rotors 92 and with four suitably spaced exhaust passages associated with the main rotor 90 together with four combustion chambers in communication with the four regions in which the four auxiliary rotors cooperate with the main rotor, the arrangement shown in Figure 13 will provide twelve complete cycles of intake, compression, combustion and exhaust for each complete rotation of the main rotor 90.

Since the previously described preferred embodiment of the invention provides three complete cycles for each rotation of the main rotor it is apparent that the addition of three more auxiliary rotors multiplies the power output with relatively little additional physical structure. It will be further noted that in both arrangements, the first arrangement with a single auxiliary rotor and the second arrangement with four auxiliary rotors, the stresses involved in carrying out the simultaneous cycles are distributed in a balanced manner around the main rotor.

Figures 14 to 16 illustrate two facts. The first fact is that the pistons associated with a rotor may be positioned on the face of the rotor as distinguished from the periphery of the rotor. The second fact is that the planes of rotation of the coacting rotors may be such that the paths of piston movement intersect at other than 90 degree angles. In other words the tangents of the two circular paths of piston movement at the intersection of the two paths may be at acute angles relative to each other.

In the construction shown in Figures 14 and 15 the three main pistons 96 project laterally from a side face 97 of the main rotor 98 while the auxiliary pistons 99 are carried by the auxiliary rotor 100 in the previously described manner.

Since the piston paths intersect at acute angles the various pistons 96 and 99 are beveled to different curvatures than heretofore described to provide the necessary coaction between the leading end of one piston and the trailing end of the next preceding piston in the intersection space.

One important advantage of such an arrangement is that the leading and trailing faces of the main pistons 96 may be substantially radial with respect to the axis of rotation of the main rotor or substantially normal with respect to the direction of travel of the main pistons. Thus, pressure against the main pistons involved in the power strokes, as well as the exhaust strokes of the engine, do not create side thrust against the pistons.

Figure 16 shows the angular relationships among the various passages required for the positioning of two rotors in the manner shown in Figures 14 and 15. The main pistons 96 travel in a main circular working passage 105 and the auxiliary pistons 99 travel in an auxiliary circular working passage 106. An intake passage 107 communicates with the auxiliary circular working passage 106 in the manner heretofore described and an exhaust passage 108 communicates with the main circular working passage 105. A passage 110 provided for communication with a combustion chamber communicates with both circular working passages 105 and 106 adjacent the intersection of the two circular passages. The operation of this final form of the invention may be readily understood from previous discussion.

My disclosure in detail of the presently preferred embodiment of the invention together with my more general discussion of modifications, will suggest to those skilled in the art additional modifications and other changes departing from my disclosure that properly lie within the spirit and scope of my appended claims. For example the invention may be adapted to function as a turbine, either gas or steam, or as a compressor or pump.

Having described my invention, I claim:

1. An internal combustion engine having: a casing; a first power rotor in said casing having at least one peripheral piston, said casing and rotor forming a first circular passage for said piston; a second rotor in said casing to supply fuel charges to said power rotor, said second rotor having at least one peripheral piston, said casing and second rotor forming a second circular passage for the latter piston, said two passages intersecting and thereby forming a common intersection space, said casing providing an intake passage to said second circular passage, an exhaust passage from said first circular passage and a passage in communication with a combustion chamber, said last mentioned passage being in communication with both said circular passages adjacent said intersection space; and means interconnecting said rotors for synchronous operation to cause the pistons of said first and second rotors, respectively, to pass through said intersection space alternately, whereby a piston of said first rotor occupies said intersection space to block said second circular passage for cooperation with at least one piston of said second rotor for intake and compression on opposite sides, respectively, of the blocking piston, and whereby alternately a piston of said second rotor occupies said intersection space to block said first circular passage for cooperation with at least one piston of said first rotor for combustion expansion and exhaust on opposite sides, respectively, of the last mentioned blocking piston.

2. An internal combustion engine as set forth in claim 1 in which the tangents of said circular passages at said intersection space are substantially perpendicular to each other.

3. An internal combustion engine as set forth in claim 1 in which each of said rotors has a plurality of spaced pistons.

4. An internal combustion engine as set forth in claim 1 in which said first rotor has three pistons and said second rotor has two pistons whereby the engine completes three cycles on each rotation of said first rotor.

5. An internal combustion engine as set forth in claim 1 in which said pistons have complementary beveled leading and trailing faces and are dimensioned to cause the leading face of each piston to move substantially into contact with the trailing face of the immediately preceding piston in said intersection space whereby the pistons of the two rotors cooperate to continuously occupy said intersection space.

6. An internal combustion engine as set forth in claim 1 in which the pistons of each of said rotors are transversely concave at their peripheral surfaces and are dimensioned to substantially conform to the periphery of the other rotor between the pistons of said other rotor.

7. An internal combustion engine as set forth in claim 1 in which said passage communicating with the combustion chamber is in communication with a relatively extensive portion of said first circular passage and is in communication with a relatively restricted portion of said second circular passage immediately adjacent said intersection space.

8. An internal combustion engine as set forth in claim 1 which includes a check valve for unidirectional flow from said second circular passage to said passage communicating with the combustion chamber.

9. An internal combustion engine as set forth in claim 1 in which the pistons carried by at least one of said rotors project laterally from one face of the rotor.

10. An internal combustion engine as set forth in claim 9 in which the tangents of said circular passages at said intersection space intersect at acute angles.

11. An internal combustion engine having: a casing; a main rotor in said casing having a plurality of main pistons, said casing and main rotor forming a main circular passage for said main pistons; a plurality of auxiliary rotors in said casing each having at least one auxiliary piston, said casing and said plurality of auxiliary rotors forming a corresponding plurality of auxiliary circular passages for the auxiliary pistons, said auxiliary passages intersecting said main passage at spaced points and thereby forming a corresponding plurality of intersection spaces, said casing providing a plurality of intake passages to said auxiliary passages respectively, a corresponding plurality of exhaust passages from said main passage near said intersection spaces respectively, and a plurality of combustion passages, each of said combustion passages being in communication with one of said auxiliary passages and also with said main passage adjacent said intersection spaces respectively; and means interconnecting said rotors for synchronous operation to cause said main pistons and at least one auxiliary piston to pass through each of said intersection spaces alternately, whereby a main piston occupies each intersection space to block the corresponding auxiliary circular passage to cooperate with at least one corresponding auxiliary piston for intake and compression on opposite sides respectively of the blocking main piston, and whereby an auxiliary piston alternately occupies the corresponding intersection space to block said main circular passage for cooperation with two successive main pistons for power expansion and exhaust on opposite sides, respectively, of the blocking auxiliary piston.

12. An internal combustion engine as set forth in claim 11 in which the leading ends of the main pistons and the trailing ends of the auxiliary pistons are beveled complementary to each other and the trailing ends of the main pistons and the leading ends of the auxiliary pistons are likewise beveled complementary to each other whereby the successive pistons overlap in said intersection spaces.

13. An internal combustion engine as set forth in claim 11 in which each of said auxiliary rotors carries a single auxiliary piston.

14. An internal combustion engine as set forth in claim 13 in which said main rotor carries three main pistons whereby twelve cycles are completed for each rotation of said main rotor.

References Cited in the file of this patent

UNITED STATES PATENTS

| Number | Name | Date |
|---|---|---|
| 1,850,904 | Woodward | Mar. 22, 1932 |
| 2,010,797 | Archbold et al. | Aug. 6, 1935 |

FOREIGN PATENTS

| Number | Country | Date |
|---|---|---|
| 545,918 | France | Aug. 4, 1922 |